(12) United States Patent
Nagaya et al.

(10) Patent No.: US 7,780,380 B2
(45) Date of Patent: *Aug. 24, 2010

(54) INSERT-INDEXABLE TOOL

(75) Inventors: Hidehiko Nagaya, Joso (JP); Norio Aso, Sarushima-gun (JP); Shoichiro Watanabe, Shimotsuma (JP); Yasuharu Imai, Shimotsuma (JP); Kouichi Kageyama, Tsukuba (JP)

(73) Assignee: Mitsubishi Materials Corporation, Chiyoda-ku (JP)

( * ) Notice: Subject to any disclaimer, the term of this patent is extended or adjusted under 35 U.S.C. 154(b) by 684 days.

This patent is subject to a terminal disclaimer.

(21) Appl. No.: 11/680,114

(22) Filed: Feb. 28, 2007

(65) Prior Publication Data

US 2007/0207671 A1    Sep. 6, 2007

(30) Foreign Application Priority Data

Mar. 2, 2006    (JP)    ............................ 2006-056046
Jan. 10, 2007    (JP)    ............................ 2007-002172

(51) Int. Cl.
*B23B 27/08* (2006.01)
*B23B 29/04* (2006.01)

(52) U.S. Cl. ...................................... 407/101; 407/110

(58) Field of Classification Search ................. 407/110, 407/91, 101–105
See application file for complete search history.

(56) References Cited

U.S. PATENT DOCUMENTS

| | | | |
|---|---|---|---|
| 3,296,683 A | 1/1967 | Kaiser | |
| 3,551,977 A | 1/1971 | Novkov | |
| 3,708,843 A | 1/1973 | Erkfritz | |
| 3,775,818 A | 12/1973 | Sirola | |
| 4,321,846 A | 3/1982 | Neamtu | |
| 5,112,164 A * | 5/1992 | Pano | ........................... 407/110 |
| 5,288,180 A | 2/1994 | Hedlund | |
| 5,688,080 A * | 11/1997 | Hedlund | ...................... 407/101 |
| 5,709,508 A * | 1/1998 | Barazani et al. | ............. 407/101 |

(Continued)

FOREIGN PATENT DOCUMENTS

CN    1498147 A    5/2004

(Continued)

OTHER PUBLICATIONS

European Search Report mailed Apr. 9, 2010 for the corresponding European Patent Application No. 07004151.2.

*Primary Examiner*—Will Fridie, Jr.
(74) *Attorney, Agent, or Firm*—Leason Ellis LLP.

(57) ABSTRACT

An insert-indexable tool includes a holder and a head member having an insert mount seat by which an insert is to be held. The head member includes a first mount face and a second mount face that intersect each other from a view facing toward the cutting face in a state in which the insert is held by the insert mount seat. The holder includes a first receiving face abutting the first mount face and a second receiving face abutting the second mount face. The first receiving face and the second receiving face are respectively provided with a first fixing threaded hole and a second fixing threaded hole into which fixing screws are inserted into the first mount face and the second mount face. The first fixing threaded hole and the second fixing threaded hole are located so that the fixing screws do not intersect each other.

11 Claims, 11 Drawing Sheets

U.S. PATENT DOCUMENTS

| | | |
|---|---|---|
| 5,833,403 A | 11/1998 | Barazani |
| 6,139,227 A | 10/2000 | Schafer et al. |
| 6,186,704 B1 | 2/2001 | Hale |
| 7,144,205 B2 | 12/2006 | Sheffler et al. |
| 7,217,068 B2 * | 5/2007 | Oettle .................. 407/101 |
| 2002/0131829 A1 | 9/2002 | Persson et al. |
| 2004/0247404 A1 | 12/2004 | Oettle |
| 2007/0177951 A1 | 8/2007 | Sakamoto et al. |

FOREIGN PATENT DOCUMENTS

| | | |
|---|---|---|
| EP | 0312223 | 4/1989 |
| EP | 0417862 | 3/1991 |
| EP | 0526438 A2 | 2/1993 |
| EP | 000576806-0001 | 11/2006 |
| EP | 000576814-0001 | 11/2006 |
| JP | 5-192802 | 8/1993 |
| JP | 2902085 | 3/1999 |
| SU | 1407688 | 7/1988 |
| WO | WO-0051768 A1 | 9/2000 |
| WO | 02074475 A1 | 9/2002 |

* cited by examiner

INSERT-INDEXABLE TOOL

BACKGROUND OF THE INVENTION

1. Field of the Invention

The present invention relates to an insert-indexable tool used for grooving, cutting-off, or the like of object to be machined.

Priority is claimed on Japanese Patent Applications No. 2006-56046, filed Mar. 2, 2006, and No. 2007-2172, filed Jan. 10, 2007, the contents of which are incorporated herein by reference.

2. Description of Related Art

As an insert-indexable tool used for a grooving operation or a cutting-off operation, an insert-indexable tool is known in which a pair of jaws are formed in an elastically deformable manner at a distal end of a holder, one of the pair of jaws has a pressing face, the other of the pair of jaws has a base face, the pressing face and the base face are arranged so as to face each other, and a insert having a cutting edge is clamped by the pressing face and the base face.

An insert-indexable tool, in which a pair of jaws are included in a head member that is detachably attached to a holder, has been proposed in Japanese Unexamined Patent Application, First Publication No. H05-192802.

In the insert-indexable tool disclosed in the above patent document, a first blade and a second blade that perpendicularly intersect each other are provided on the head member, and the first and second blades are abutted and fixed to the distal end of the holder using fixing screws. The fixing screws are disposed in a plane, and the relative positional relationship between the head member and the holder can be easily changed because the head member can be mounted in two ways oriented in one and another directions perpendicularly intersecting each other.

In the insert-indexable tool disclosed in the above patent document, the fixing screws to be screwed into two planes perpendicularly intersecting each other must be disposed in a plane in order to make it possible for the head member to be mounted in two ways oriented in one and another directions perpendicularly intersecting each other. Accordingly, the lengths of the fixing screws are limited to prevent interference therebetween; therefore, the pair of jaws cannot be firmly fixed. If one threaded hole is located at a position remote from the insert in order to ensure the length of the screw, the cutting force cannot be sufficiently received by the fixing screw because the fixing screw is located at a position remote from the insert.

When the head member cannot be firmly fixed, the position of the head member may be shifted due to the cutting force, and dimensional accuracy during a cutting operation may be degraded.

SUMMARY OF THE INVENTION

The present invention was conceived in view of the aforementioned circumstances, and an object thereof is to provide an insert-indexable tool in which a head member having a pair of jaws can be firmly fixed to a holder, and by which a cutting operation with a high accuracy can be performed.

In order to achieve the above object, the present invention provides an insert-indexable tool including: a holder; and a head member having an insert mount seat by which an insert having a cutting edge and a cutting face is to be held, and mounted on a distal portion of the holder, wherein the head member includes a first mount face and a second mount face intersect each other from a view facing toward the cutting face in a state in which the insert is held by the insert mount seat, the holder includes, at the distal portion thereof, a first receiving face abutting the first mount face and a second receiving face abutting the second mount face, the first receiving face and the second receiving face are respectively provided with a first fixing threaded hole and a second fixing threaded hole into which fixing screws inserted into the first mount face and the second mount face are screwed, and the first fixing threaded hole and the second fixing threaded hole are located so that the fixing screws screwed into the first and second fixing threaded holes do not intersect each other.

According to the insert-indexable tool configured as described above, because the first fixing threaded hole and the second fixing threaded hole, which are respectively formed in the first receiving face and the second receiving face that intersect each other from a view facing toward the cutting face and into which fixing screws inserted into the first receiving face and the second receiving face are screwed, are located so that the fixing screws screwed into the first and second fixing threaded holes do not intersect each other, the fixing screws may be sufficiently long, and also the fixing screws may be disposed close to the insert. Therefore, the head member having the insert mount seat can be firmly fixed to the holder. In addition, even if the head member is broken, it is sufficient to only replace the head member to reuse the insert-indexable tool, and thus the running cost can be reduced when compared with the case in which an insert-indexable tool having an integrally formed head member and holder is used.

In the above insert-indexable tool, the head member may include a first jaw having a pressing face, and a second jaw having a base face which faces the pressing face, the pressing face and the base face constituting the insert mount seat, the insert may be held by the insert mount seat while a surface on a side opposite to the cutting face is seated on the base face, and the fixing screw may be inserted into one of the first and second mount faces corresponding to the second jaw. According to this configuration, in the insert-indexable tool in which an insert is held, the second jaw having the base seat on which the insert is mounted can be firmly fixed to the distal portion of the holder.

In the above insert-indexable tool, the first mount face may be provided with a first insertion hole, and, in a state in which the first mount face abuts the first receiving face and the second mount face abuts the second receiving face, the first fixing threaded hole and the first insertion hole may be arranged in an offset manner such that the first fixing threaded hole is located farther from the second receiving face than the first insertion hole. According to this configuration, the second mount face and the second receiving face firmly abut each other when the fixing screws are screwed into, and the head member can be firmly fixed.

In the above insert-indexable tool, the second mount face may be provided with a second insertion hole, and, in a state in which the first mount face abuts the first receiving face and the second mount face abuts the second receiving face, the second fixing threaded hole and the second insertion hole may be arranged in an offset manner such that the second fixing threaded hole is located farther from the first receiving face than the second insertion hole. According to this configuration, the first mount face and the first receiving face firmly abut each other when the fixing screws are screwed into, and the head member can be firmly fixed.

In the above insert-indexable tool, the holder may include a third receiving face oriented in a direction same as the cutting face, and the head member may include a third mount face which is to be abutted with the third receiving face. According to this configuration, the primary component of the cutting force loaded on the insert during a cutting operation can be received by the third receiving face 19; therefore, shifting of the head member due to the cutting force can be prevented, and the cutting operation can be performed with high accuracy.

In the above insert-indexable tool, in a state in which the first mount face abuts the first receiving face and the second mount face abuts the second receiving face, at least one of the first fixing threaded hole and the second fixing threaded hole may be arranged closer to the third receiving face than at least one of the first insertion hole and the second insertion hole into which the fixing screw or screws to be screwed into the at least one of the first fixing threaded hole and the second fixing threaded hole are inserted. According to this configuration, the head member is urged to and firmly contacts the third receiving face when the fixing screws are screwed into; therefore, the head member can be firmly and stably fixed In the above insert-indexable tool, at least one of the first receiving face and the second receiving face may be provided with a drawing threaded hole at a position farther from the other of the first receiving face and the second receiving face than the fixing threaded hole formed therein, and the drawing threaded hole may obliquely intersect at least one of the first receiving face and the second receiving face while gradually approaching the third receiving face as extending toward an inside of the holder. According to this configuration, the head member can be fixed to the third receiving face in a firm contact manner by screwing the drawing screw, which is inserted into the first mount face or the second mount face, into the drawing threaded hole. Moreover, because the drawing threaded hole formed in at least one of the first receiving face and the second receiving face is located at a position farther from one receiving face than the fixing threaded hole formed in the other receiving face in which the drawing threaded hole is formed, the drawing threaded hole will not interfere with the fixing threaded hole inside the holder, and thus the length of the fixing screws can be ensured.

In the above insert-indexable tool, the third receiving face or an extension thereof extended in a direction along which the insert extends may intersect the second receiving face. According to this configuration, because the second receiving face is disposed at an extension of the third receiving face extended in the direction along which the insert extends, the primary component of the cutting force can be received by the third receiving face, and the thrust force can be received by the second receiving face. Therefore, shifting of the head member due to the cutting force loaded on the insert can be reliably prevented, and the cutting operation can be performed with high accuracy.

In the above insert-indexable tool, the insert may be disposed so as to at least partially overlap the third receiving face from a view facing toward the cutting face. According to this configuration, the primary component of the cutting force loaded on the insert can be received by the third receiving face in more reliable manner, and thus shifting of the head member due to the cutting force can be prevented in more reliable manner.

In the above insert-indexable tool, a distal portion of the holder may be provided with a clamping screw that elastically deforms the head member so that the first jaw and the second jaw approach each other, and the clamping screw may obliquely extend, with respect to a direction facing toward the cutting face, away from the first receiving face as extending from the first jaw toward the second jaw. According to this configuration, the clamping screw not only elastically deforms the head member but also fixes the head member to the holder; therefore, the head member can be firmly fixed in more reliable manner.

In the above insert-indexable tool, the first fixing threaded hole and the second fixing threaded hole may be located at positions different from each other on a coordinate axis in parallel with a normal of the cutting face. According to this configuration, because the fixing screws screwed into the first and second fixing threaded holes do not intersect each other, the fixing screws may be sufficiently long.

As described above, according to the present invention, an insert-indexable tool in which a head member having a pair of jaws can be firmly fixed to a holder, and by which a cutting operation with a high accuracy can be performed, is provided.

DETAILED DESCRIPTION OF THE INVENTION

A first embodiment of the present invention will be explained below with reference to the appended drawings. An insert-indexable tool 100 according to the first embodiment is shown in FIGS. 1 to 6.

The insert-indexable tool 100 includes a holder 10 having a substantially quadrangular column shape, a head member 30 which is mountable on the tip of the holder 10, and an insert 60 which is to be held by the head member 30.

Figure 2:
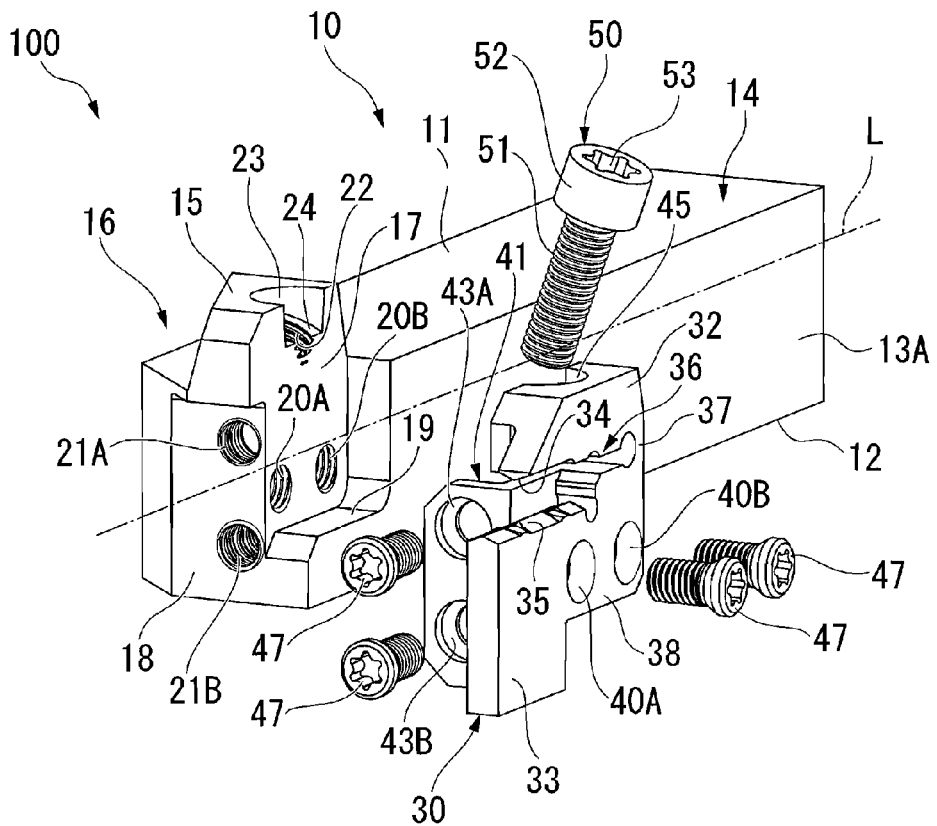
FIG. 2 is an exploded perspective view of the insert-indexable tool shown in FIG. 1.
Figure 3:
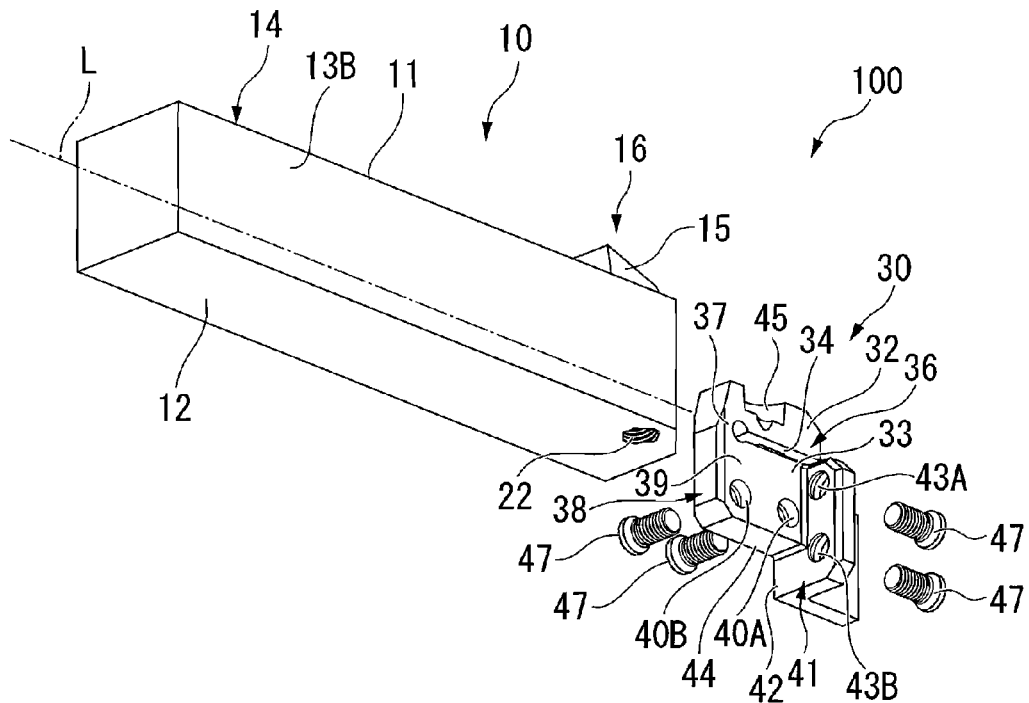
FIG. 3 is another exploded perspective view of the insert-indexable tool shown in FIG. 1, as viewed from a view point which is different from that in FIG. 2.

As shown in FIGS. 2 and 3, the holder 10 is formed in a substantially quadrangular column shape, and includes an upper face 11 and a bottom face 12 arranged oppositely and a pair of side faces 13A and 13B. The proximal portion of the holder 10 (the portion thereof shown in the upper-right in FIG. 2, and shown in the upper-left in FIG. 3) is formed as a shank portion 14 extending along an axis L, and the distal portion of the holder 10 (the portion thereof shown in the lower-left in FIG. 2, and shown in the lower-right in FIG. 3) that includes a projected portion 15 projecting upward from the upper face 11 is designated as a mount portion 16 for mounting the head member 30 that will be separately explained below.

The mount portion 16 includes a first receiving face 17 formed in a planar shape and extending in parallel with a first side face 13A of the holder 10, a second receiving face 18 formed in a planar shape, extending perpendicularly to both of the first receiving face 17 and the axis L, and constituting a distal end face of the holder 10, and a third receiving face 19 formed in a planar shape and perpendicularly intersecting both of the first receiving face 17 and the second receiving face 18.

The first receiving face 17 is configured so as to be stepped from the first side face 13A toward a second side face 13B, and to merge with a surface of the projected portion 15 that is oriented likewise the first side face 13A. The first receiving face 17 is provided with two first fixing threaded holes 20A and 20B extending in the direction perpendicular to the first receiving face 17, and aligned in the direction of the axis L, i.e., arranged so that the openings thereof are aligned, in this embodiment, in the fore-aft direction (longitudinal direction) of the holder 10.

The second receiving face 18 is arranged so as to intersect a distal portion, as conceived in the direction of the axis L, of the first receiving face 17, and is configured so as to be stepped from a distal end face of the projected portion 15 toward the proximal end. The second receiving face 18 is provided with two second fixing threaded holes 21A and 21B extending in the direction perpendicular to the second receiving face 18, and aligned in the direction perpendicular to the axis L and in parallel with the first receiving face 17, i.e., arranged so that the openings thereof are aligned, in this embodiment, in the vertical direction of the holder 10.

The third receiving face 19 is disposed between the first receiving face 17 stepped toward the second side face 13B and the first side face 13A, and oriented in a direction perpendicular to the axis L of the holder 10 and in parallel with the first receiving face 17. A distal portion, as conceived in the direction of the axis L, of the third receiving face 19 intersects the second receiving face 18. Accordingly, the second receiving face 18 includes a portion that intersects the first receiving face 17 and a portion that intersects the third receiving face 19, and formed in a substantially L-shape in front view.

The first fixing threaded holes 20A and 20B, and the second fixing threaded holes 21A and 21B are, as conceived in the direction perpendicular to the axis L and in parallel with the first receiving face 17, arranged at positions different from each other. As shown in FIG. 2, in this embodiment, the first fixing threaded holes 20A and 20B are located between the second fixing threaded holes 21A and 21B that are aligned in the direction perpendicular to the axis L and in parallel with the first receiving face 17.

Figure 6:
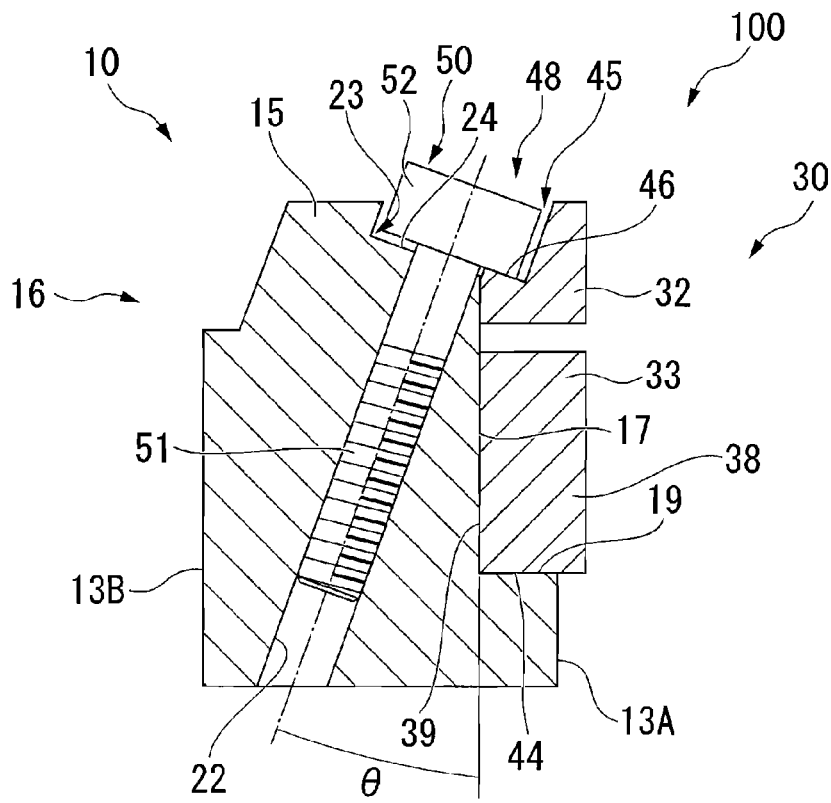
FIG. 6 is a cross-sectional view taken along the line X-X in FIG. 4.

As shown in FIG. 6, the projected portion 15 is provided with a clamping threaded hole 22 penetrating from the upper face to bottom face of the projected portion 15, and extending perpendicularly to the axis L while intersecting the first receiving face 17 at an angle θ. A recess 23 having an opening larger than that of the clamping threaded hole 22 is formed at an upper opening portion of the clamping threaded hole 22, and a portion of the recess 23 that is closest to the first side face 13A opens in the first receiving face 17. Furthermore, a bottom face 24 of the recess 23 is inclined with respect to the first receiving face 17 in such a manner that the bottom face 24 gradually shifts downward as the bottom face 24 extends toward the first side face 13A.

Next, the head member 30 that is to be mounted on the aforementioned mount portion 16 will be explained. The head member 30 includes a pair of jaws (an upper jaw 32 and a lower jaw 33) extending from a side face at an end (shown in the upper-right in FIG. 2, and shown in the upper-left in FIG. 3) toward the distal end side (shown in the lower-left in FIG. 2, and shown in the lower-right in FIG. 3), and opening toward the distal end side. The upper jaw 32 is provided with a pressing face 34 that is to downwardly press the insert 60, which will be separately explained below, and the lower jaw 33 is provided with a base face 35 that is disposed so as to face the pressing face 34. The pressing face 34 and the base face 35 constitute an insert mount seat 36. The upper jaw 32 is configured so as to elastically deform toward the lower jaw 33 while pivoting about a connection portion 37 located between the upper jaw 32 and the lower jaw 33.

From a view facing toward the distal portion, the base face 35 is configured in an inverted and projected V-shape projecting upward, and the pressing face 34 is configured in a projected V-shape projecting downward.

The upper jaw 32 is configured so that a side face thereof oriented in the other direction (oriented toward the upper-left in FIG. 2 and toward the upper-right in FIG. 3) has a shape that is substantially the same as that of the surface of the projected portion 15 that is oriented likewise the first side face 13A.

The lower jaw 33 is configured in a rectangular plate shape extending in the direction along which the insert mount seat 36 extends, and in a direction along which the pressing face 34 and the base face 35 oppose each other, and a proximal side portion thereof (a portion thereof shown in the upper-right in FIG. 2, and shown in the upper-left in FIG. 3) projects toward the other side so that the proximal side portion is thicker than a distal side portion thereof, so that a first plate 38 is configured.

The surfaces of the upper jaw 32 and the lower jaw 33 formed in the first plate 38 and oriented toward the other side are designated as a first mount face 39 that is to be abutted with the first receiving face 17 of the holder 10. The first mount face 39 is shared by the upper jaw 32 and the lower jaw 33; however, the first mount face 39 is formed within a plane.

The first plate 38 is provided with two first insertion holes 40A and 40B extending perpendicularly to the first mount face 39, and these two first insertion holes 40A and 40B are aligned in the direction along which the insert mount seat 36 extends.

The lower jaw 33 is provided with a second plate 41 projecting from the first mount face 39 toward the other side, and configured in a rectangular plate shape perpendicular to the first mount face 39 and extending in the direction along which the pressing face 34 and the base face 35 oppose each other.

The surface of the second plate 41 that is oriented toward the proximal side is designated as a second mount face 42 that is to be abutted with the second receiving face 18 of the holder 10. The second plate 41 is provided with two second insertion holes 43A and 43B extending perpendicularly to the second mount face 42, and these two second insertion holes 43A and 43B are aligned in the direction along which the pressing face 34 and the base face 35 oppose each other.

The surface of the first plate 38 oriented downward is a plane that perpendicularly intersects both of the first mount face 39 and the second mount face 42, and is designated as a third mount face 44 that is to be abutted with the third receiving face 19 of the holder 10. The third mount face 44 intersects the second mount face 42 in the direction along which the insert mount seat 36 extends, and the second mount face 42 is configured in substantially an L-shape that is a mirror image of the L-shape of the second receiving face 18.

The upper jaw 32 is provided with a spot facing 45 that opens in the upper face of the upper jaw 32, extends in parallel with the second mount face 42, and obliquely intersects the first mount face 39. A bottom face 46 of the spot facing 45 is inclined with respect to the first mount face 39 in such a manner that the bottom face 46 gradually shifts downward as the bottom face 46 extends away from the first mount face 39. In addition, a portion of the spot facing 45 on the other side opens in the first mount face 39, and a cross-section of the spot facing 45 is configured in substantially a half-circular shape.

The head member 30 configured as described above is to be mounted on the mount portion 16 of the holder 10. The head member 30 is placed on the mount portion 16 in such a manner that the first, second, and third mount faces 39, 42, and 44 abut the first, second, and third receiving faces 17, 18, and 19, respectively, the axis L of the holder 10 is arranged in parallel with the direction along which the insert mount seat 36 extends, and the direction along which the pressing face 34 and the base face 35 of the insert mount seat 36 oppose each other is arranged in parallel with the direction perpendicular to the axis L and in parallel with the first receiving face 17.

In side view of the holder 10 on which the head member 30 is placed, the first fixing threaded holes 20A and 20B and the first insertion holes 40A and 40B are arranged in an offset manner such that the first fixing threaded holes 20A and 20B are located farther from the second receiving face 18 than the first insertion holes 40A and 40B, and closer to the third receiving face 19 than the first insertion holes 40A and 40B.

Figure 4:
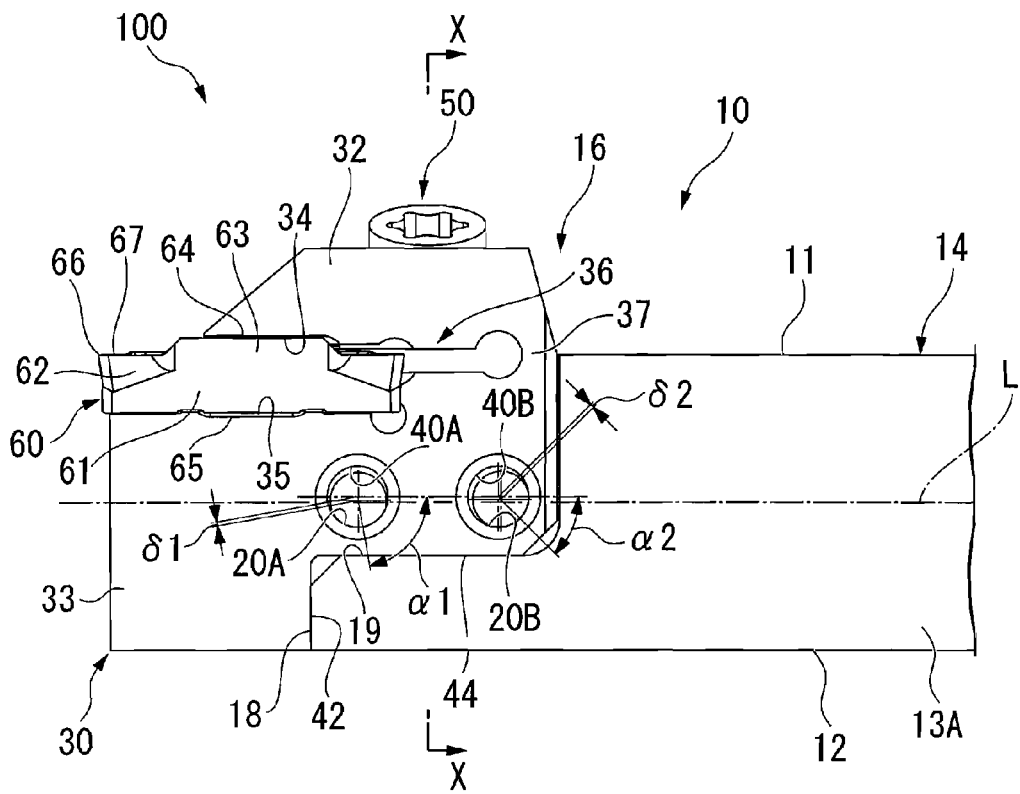
FIG. 4 is a side view illustrating the arrangement of first fixing threaded holes and first screw insertion holes.

More specifically, as shown in FIG. 4, the center of the first fixing threaded hole 20A formed in the holder 10 at a position shifted toward the distal end thereof is offset, with respect to the center of the first insertion hole 40A formed in the holder 10 at a position shifted toward the distal end thereof, by an amount of $\delta 1$ in the direction intersecting the direction along which the insert mount seat 36 extends at an angle $\alpha 1$, and the center of the first fixing threaded hole 20B formed in the holder 10 at a position shifted toward the proximal end thereof is offset, with respect to the center of the first insertion hole 40B formed in the holder 10 at a position shifted toward the proximal end thereof, by an amount of $\delta 2$ in the direction intersecting the direction along which the insert mount seat 36 extends at an angle $\alpha 2$.

It is preferable that the angles $\alpha 1$ and $\alpha 2$ be respectively set so as to satisfy inequalities of $0°\leq\alpha 1\leq 90°$ and $0°\leq\alpha 2\leq 90°$. In this embodiment, both of the angles $\alpha 1$ and $\alpha 2$ are set to be acute angles, and an inequality of $\alpha 1>\alpha 2$ is satisfied; however, instead, an inequality of $\alpha 1\leq\alpha 2$ may be satisfied.

As viewed from a point remote from the distal end of the holder 10 on which the head member 30 is placed, the second fixing threaded holes 21A and 21B and the second insertion holes 43A and 43B are arranged in an offset manner such that the second fixing threaded holes 21A and 21B are located farther from the first receiving face 17 than the second insertion holes 43A and 43B, and closer to the third receiving face 19 than the second insertion holes 43A and 43B.

Figure 5:
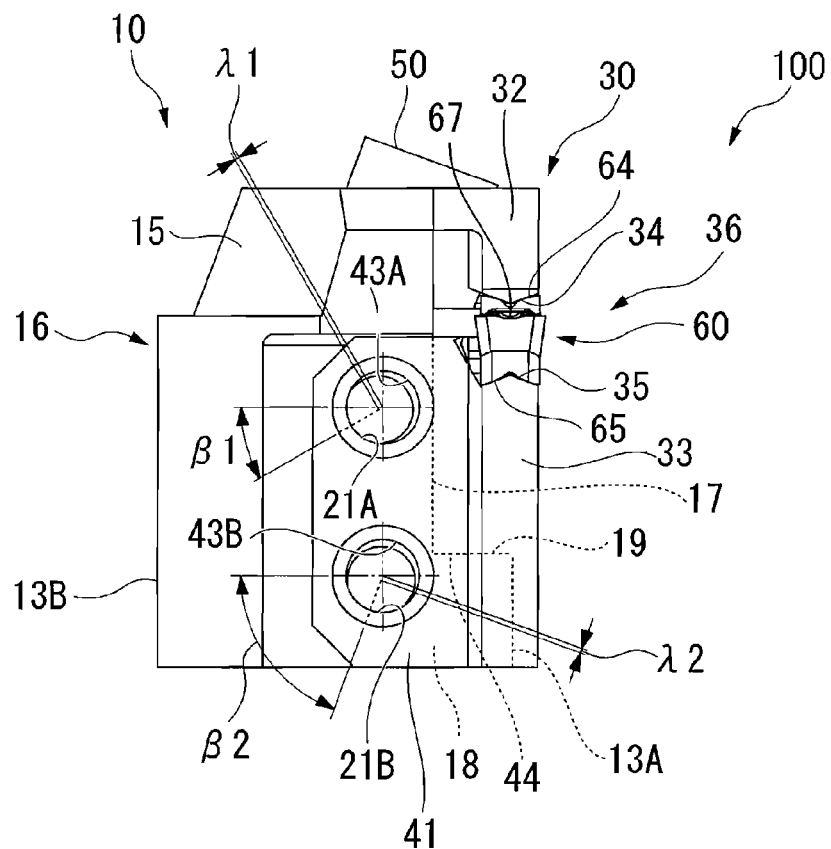
FIG. 5 is a front view illustrating the arrangement of second fixing threaded holes and second screw insertion holes.

More specifically, as shown in FIG. 5, the center of the second fixing threaded hole 21A formed in the holder 10 at a position shifted toward the upper face 11 is offset, with respect to the center of the second insertion hole 43A formed in the holder 10 at a position shifted toward the upper face 11, by an amount of $\lambda 1$ in the direction intersecting the direction perpendicular to the first receiving face 17 at an angle $\beta 1$, and the center of the second fixing threaded hole 21B formed in the holder 10 at a position shifted toward the bottom face 12 is offset, with respect to the center of the second insertion hole 43B formed in the holder 10 at a position shifted toward the bottom face 12, by an amount of $\lambda 2$ in the direction intersecting the direction perpendicular to the first receiving face 17 at an angle $\beta 2$.

It is preferable that the angles $\beta 1$ and $\beta 2$ be respectively set so as to satisfy inequalities of $0°\leq\beta 1\leq 90°$ and $0°\leq\beta 2\leq 90°$. In this embodiment, both of the angles $\beta 1$ and $\beta 2$ are set to be acute angles, and an inequality of $\beta 1<\beta 2$ is satisfied; however, instead, an inequality of $\beta 1\geq\beta 2$ may be satisfied.

Fixing screws 47 are inserted into the first and second insertion holes 40A, 40B, 43A, and 43B arranged as described above, and screwed into the first and second fixing threaded holes 20A, 20B, 21A, and 21B, thereby the head member 30 is mounted on the holder 10, and the insert mount seat 36 is disposed at the distal portion of the holder 10.

When the upper jaw 32 is abutted with the projected portion 15, the recess 23 of the projected portion 15 is merged with the spot facing 45 of the upper jaw 32, thereby an accommodating portion 48 having a circular cross-section is formed, and the clamping threaded hole 22 is disposed at the bottom of the accommodating portion 48. It should be noted that, in the accommodating portion 48, the bottom face 46 of the spot facing 45 is slightly shifted toward the opening of the accommodating portion 48 when compared with the bottom face 24 of the recess 23. A clamping screw 50, which is a clamping means for elastically deforming the upper jaw 32 so that the pressing face 34 of the insert mount seat 36 is moved toward the base face 35, is to be screwed into the clamping threaded hole 22. The clamping screw 50 includes a male screw portion 51 having a male thread on the outer surface thereof, and a head portion 52 configured in a cylindrical shape having a diameter greater than that of the male screw portion 51. The head portion 52 is provided with, at an end face thereof, an engagement hole 53 with which a general purpose tool such as a wrench is to be engaged.

Next, the insert 60 that is to be held by the insert mount seat 36 will be explained below. The insert 60 is made of a hard material such as cemented carbide, and includes an insert body 61 configured in substantially a quadrangular rod shape, and cutting edge portions 62. The width of the insert body 61 is constant along the longitudinal direction thereof, and a projection portion 63 is formed on the insert body 61 at a middle portion thereof in lengthwise.

An upper face of the projection portion 63 is designated as a press hold face 64. The press hold face 64 is configured in a concave V-shape that is made concave downwardly so as to be abutted with the pressing face 34.

Moreover, a bottom face of the insert body 61 is designated as a seat face 65. The seat face 65 is configured in an inverted concave V-shape that is made concave upwardly so as to be abutted with the base face 35 configured in an inverted convex V-shape.

The cutting edge portions 62 are respectively provided on upper faces of lengthwise end portions of the insert body 61, and a cutting edge 66 extending in the direction perpendicular to the longitudinal direction of the insert body 61 is formed in each of the cutting edge portions 62. The surfaces at the lengthwise ends of the insert body 61 which are respectively connected to the cutting edges 66 are designated as flanks of the cutting edges 66. A positive flank angle is defined to each of the flanks by inclination of the flank in such a manner that the flank extends toward the lengthwise middle portion of the insert body 61 while extending toward the bottom portion of the insert body 61.

A portion of the upper face of the insert 60, which is connected to the cutting edge 66, is designated as a cutting face 67. The cutting face 67 is configured in a symmetric trapezoid shape in such a manner that the width of the cutting face 67 in plan view is made greater than that of the insert body 61 as the cutting face 67 extends toward the cutting edge 66. In other words, the insert 60 is a so-called dog-bone type insert that is configured to be symmetric about the lengthwise center.

The insert 60 configure as described above is held by the insert mount seat 36 of the head member 30 that is mounted on the distal end portion of the holder 10, thereby the insert-indexable tool 100 is configured.

The insert 60 is inserted into the insert mount seat 36, and the insert 60 is seated on the base face 35 while the seat face 65 abuts the base face 35. By screwing the clamping screw 50 toward the holder 10 in this state, the head portion 52 of the clamping screw 50 presses the bottom face 46 of the spot facing 45 in the upper jaw 32, and the head member 30 is elastically deformed in such a manner that the upper jaw 32 approaches the lower jaw 33 while having therebetween the connection portion 37 as a pivot. As a result, the pressing face 34 of the upper jaw 32 abuts the press hold face 64 of the insert 60, the insert 60 is pressed toward the base face 35, and the insert 60 is held by the base face 35 and the pressing face 34.

As shown in FIG. 4, when the insert 60 is held as described above, the cutting face 67 that is connected to the cutting edge 66 of the insert 60 is arranged in parallel with the third receiving face 19. As a result, the direction facing toward the cutting face 67 is arranged in parallel with the direction along which the pressing face 34 and the base face 35 oppose each other, and with the direction perpendicular to the axis L of the holder 10 and in parallel with the first receiving face 17, and the direction along which the insert 60 extends is arranged in parallel with the direction along which the insert mount seat 36 extends, and in parallel with the axis L of the holder 10.

Accordingly, the first fixing threaded holes 20A and 20B and the second fixing threaded holes 21A and 21B are arranged at positions different from each other along the direction facing toward the cutting face 67.

As shown in FIG. 5, the insert 60 is arranged in such a manner that, as viewed from the direction facing toward the cutting face 67, the insert 60 partially overlaps the third receiving face 19 and the second receiving face 18 that substantially intersects the third receiving face 19 at the distal portion of the holder 10. In this embodiment, from a view facing toward the cutting face 67, the widthwise center line of the insert 60 is substantially aligned, in the widthwise direction, with an intersecting ridge of the third receiving face 19 and the first side face 13A of the holder 10.

The insert-indexable tool 100 configured as described above is supported in a machine tool such as a lathe or a machining center while holding the insert 60 that is held by the insert mount seat 36, is moved with respect to a workpiece while the insert 60 is pressed against the workpiece that is rotated at high speed, and thereby cuts an outer peripheral portion or an end portion of the workpiece.

According to the insert-indexable tool 100 of the first embodiment, because, as viewed from the direction perpendicular to the axis L of the holder 10 and in parallel with the first receiving face 17 (the direction facing toward the cutting face 67), the first fixing threaded holes 20A and 20B formed in the first receiving face 17 and the second fixing threaded holes 21A and 21B formed in the second receiving face 18 are arranged at positions different from each other, the first fixing threaded holes 20A and 20B do not intersect the second fixing threaded holes 21A and 21B within the holder 10, and thus the thread length of the fixing screws 47 may be long. In addition, by screwing the fixing screws 47 into the first fixing threaded hole 20A formed in the holder 10 at a position shifted toward the distal end thereof and into the second fixing threaded hole 21A formed in the holder 10 at a position shifted toward the upper face 11, the head member 30 can be fixed to the holder 10 at positions near the insert 60.

Moreover, because the third receiving face 19 is formed in the mount portion 16 of the holder 10 so as to be oriented in the direction perpendicular to the axis L of the holder 10 and in parallel with the first receiving face 17 (the direction facing toward the cutting face 67), and the third mount face 44 that is to be abutted with the third receiving face 19 is formed in the head member 30, the primary component of the cutting force loaded on the insert 60 during a cutting operation can be received by the third receiving face 19; therefore, shifting of the head member 30 due to the cutting force can be prevented, and the cutting operation can be performed with high accuracy.

Moreover, because the center of the first fixing threaded hole 20A formed in the holder 10 at a position shifted toward the distal end thereof is offset, with respect to the center of the first insertion hole 40A formed in the holder 10 at a position shifted toward the distal end thereof, by an amount of $\delta 1$ in the direction intersecting the direction along which the insert mount seat 36 extends at an angle $\alpha 1$, and the center of the first fixing threaded hole 20B formed in the holder 10 at a position shifted toward the proximal end thereof is offset, with respect to the center of the first insertion hole 40B formed in the holder 10 at a position shifted toward the proximal end thereof, by an amount of $\delta 2$ in the direction intersecting the direction along which the insert mount seat 36 extends at an angle $\alpha 2$, when the fixing screws 47 are screwed into the first fixing threaded holes 20A and 20B, the head member 30 is urged to and firmly contacts the second receiving face 18 and the third receiving face 19; therefore, the head member 30 can be firmly fixed.

In an analogous manner, because the center of the second fixing threaded hole 21A formed in the holder 10 at a position shifted toward the upper face 11 is offset, with respect to the center of the second insertion hole 43A formed in the holder 10 at a position shifted toward the upper face 11, by an amount of $\lambda 1$ in the direction intersecting the direction perpendicular to the first receiving face 17 at an angle $\beta 1$, and the center of the second fixing threaded hole 21B formed in the holder 10 at a position shifted toward the bottom face 12 is offset, with respect to the center of the second insertion hole 43B formed in the holder 10 at a position shifted toward the bottom face 12, by an amount of $\lambda 2$ in the direction intersecting the direction perpendicular to the first receiving face 17 at an angle $\beta 2$, when the fixing screws 47 are screwed into the second fixing threaded holes 21A and 21B, the head member 30 is urged to and firmly contacts the first receiving face 17 and the third receiving face 19; therefore, the head member 30 can be firmly fixed in more reliable manner.

Moreover, because the third receiving face 19 substantially intersects the second receiving face 18 at a distal portion thereof as viewed from the direction of the axis L (the direction along which the insert 60 extends), the primary component of the cutting force can be received by the third receiving face 19, and the thrust force can be received by the second receiving face 18. Therefore, shifting of the head member 30 due to the cutting force can be reliably prevented.

In particular, because the aforementioned angles α1, α2, β1, and β2 are all acute angles, when the fixing screws 47 are screwed in, the first, second, and third mount faces 39, 42, and 44 are respectively urged to the first, second, and third receiving faces 17, 18, and 19, and the head member 30 is supported by these three faces which perpendicularly intersect each other, the position of the head member 30 is reliably stabilized.

Furthermore, because the insert 60 is arranged in such a manner that, as viewed from the direction facing toward the cutting face 67, the insert 60 partially overlaps the third receiving face 19 and the second receiving face 18 that substantially intersects the third receiving face 19 at the distal portion of the holder 10, the primary component of the cutting force loaded on the insert 60 can be received by the third receiving face 19 in more reliable manner, and the thrust force can be reliably received by the second receiving face 18. Therefore, shifting of the head member 30 due to the cutting force can be prevented in more reliable manner.

Moreover, because the accommodating portion 48 is formed by the connection of the recess 23 and the spot facing 45 of the upper jaw 32, and the clamping screw 50 is screwed into the clamping threaded hole 22 extending so as to be perpendicular to the axis L and to obliquely intersect the first receiving face 17, the insert 60 can be held by elastically deforming the upper jaw 32 by the clamping screw 50. Furthermore, the head member 30 is pressed by the clamping screw 50 so as to firmly contact the first receiving face 17, the head member 30 can be firmly fixed.

Figure 7:
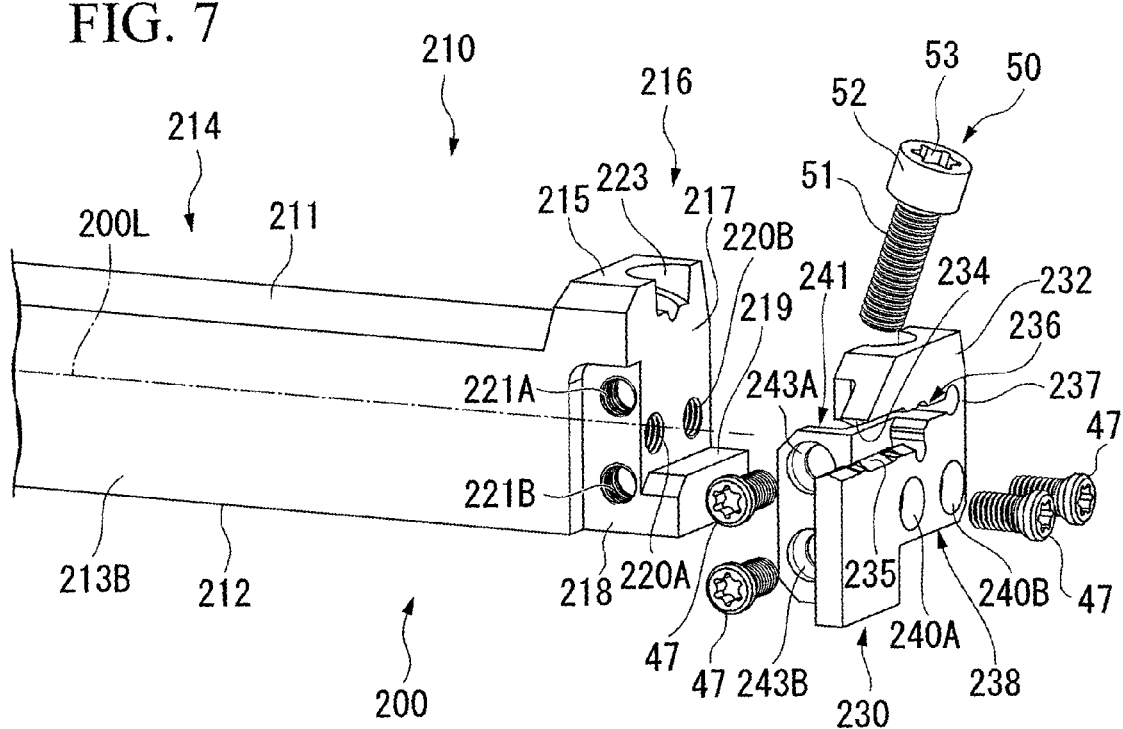
FIG. 7 is an exploded perspective view of an insert-indexable tool according to a second embodiment of the present invention.
Figure 8:
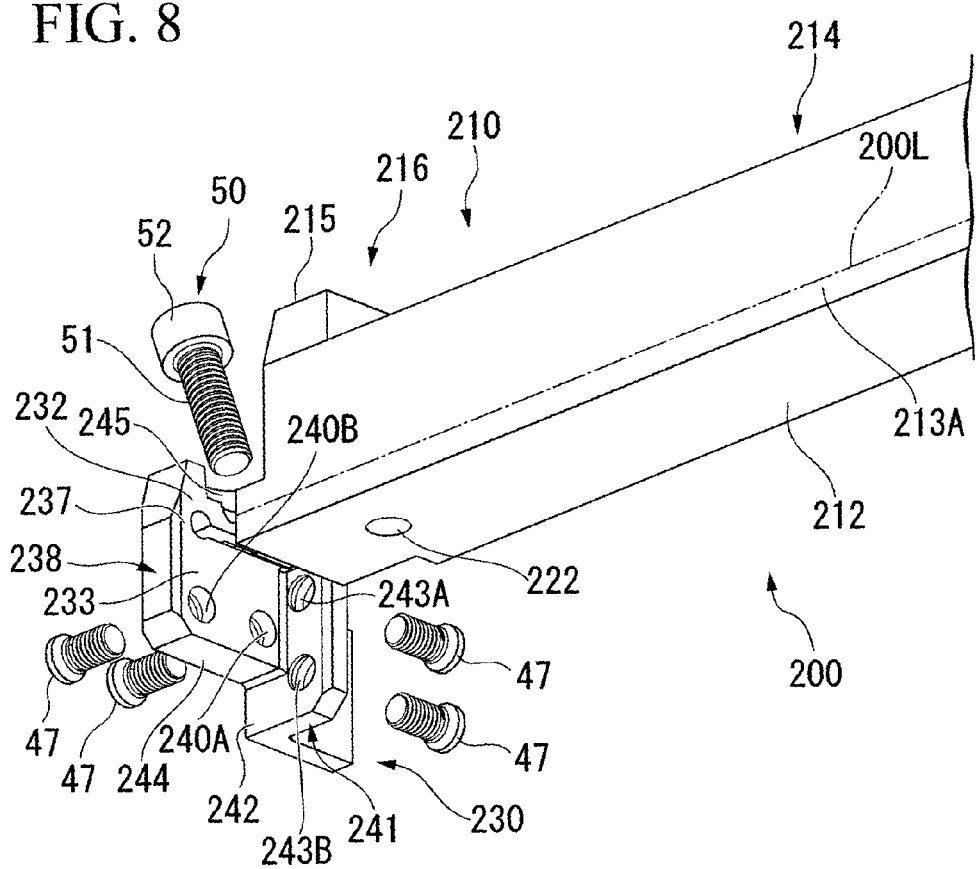
FIG. 8 is another exploded perspective view of the insert-indexable tool shown in FIG. 7, as viewed from a view point which is different from that in FIG. 7.

Next, a second embodiment of the present invention will be explained below. FIGS. 7 and 8 show a holder 210 and the head member 30 of an insert-indexable tool 200 according to the second embodiment (illustration of the insert 60 is omitted). It should be noted that the same reference symbols are applied to the elements included in the first embodiment, and explanation thereof will be omitted.

In the insert-indexable tool 200, an axis 200L of the holder 210 is arranged perpendicular with respect to the direction along which the insert mount seat 236 extends.

A mount portion 216 formed at a distal portion the holder 210 includes a first receiving face 217 formed in a planar shape and extending perpendicular to axis 200L, a second receiving face 218 arranged so as to perpendicularly intersect the first receiving face 217 near a second side face 213B of the holder 210, and a third receiving face 219 perpendicularly intersecting both of the first receiving face 217 and the second receiving face 218.

The first receiving face 217 is configured so as to be stepped from a distal end face of the holder 210 toward a proximal portion thereof. The first receiving face 217 is provided with two first fixing threaded holes 220A and 220B extending in the direction perpendicular to the first receiving face 217, and aligned in the direction in parallel with the third receiving face 219 and perpendicular to the axis 200L.

The second receiving face 218 is configured so as to be stepped from the second side face 213B toward a side face 213A of the holder 210. The second receiving face 218 is provided with two second fixing threaded holes 221A and 221B extending in the direction perpendicular to the second receiving face 218, and aligned in the direction perpendicular to the axis 200L and in parallel with the first receiving face 217.

The third receiving face 219 is disposed between the first receiving face 217, which is stepped from the distal end face of the holder 210 toward the proximal portion thereof, and the distal end face of the holder 210, and oriented in a direction perpendicular to the axis 200L of the holder 210 and in parallel with the first receiving face 217. The third receiving face 219 intersects the second receiving face 218 near the second side face 213B. Accordingly, the second receiving face 218 is configured in a substantially L-shape.

The first fixing threaded holes 220A and 220B, and the second fixing threaded holes 221A and 221B are, as conceived in the direction perpendicular to the axis 200L and in parallel with the first receiving face 217, arranged at positions different from each other. As shown in FIG. 7, in this embodiment, the first fixing threaded holes 220A and 220B are located between the second fixing threaded holes 221A and 221B that are aligned in the direction perpendicular to the axis 200L and in parallel with the first receiving face 217.

The head member 230 is mounted on the holder 210 configured as described above by the fixing screws 47. As a result, the insert mount seat 236 extending in parallel with the first mount face 39 that is abutted with the first receiving face 217 is arranged so as to extend in the direction perpendicular to the axis 200L.

Moreover, the clamping screw 50 is screwed in while being inclined from the distal portion toward the proximal portion of the holder 210, and thereby the head member 230 and the holder 210 are fixed to each other.

According to the insert-indexable tool 200 configured as described above, in a manner similar to the first embodiment, the head member 230 can be firmly fixed, and shifting of the head member 230 due to the cutting force can be prevented.

Moreover, because the insert mount seat 236 is arranged so as to extend in the direction perpendicular to the axis 200L of the holder 210, a cutting operation can be performed on an outer peripheral portion or an end portion of a workpiece that is disposed on a line perpendicular to the holder 210.

Figure 9:
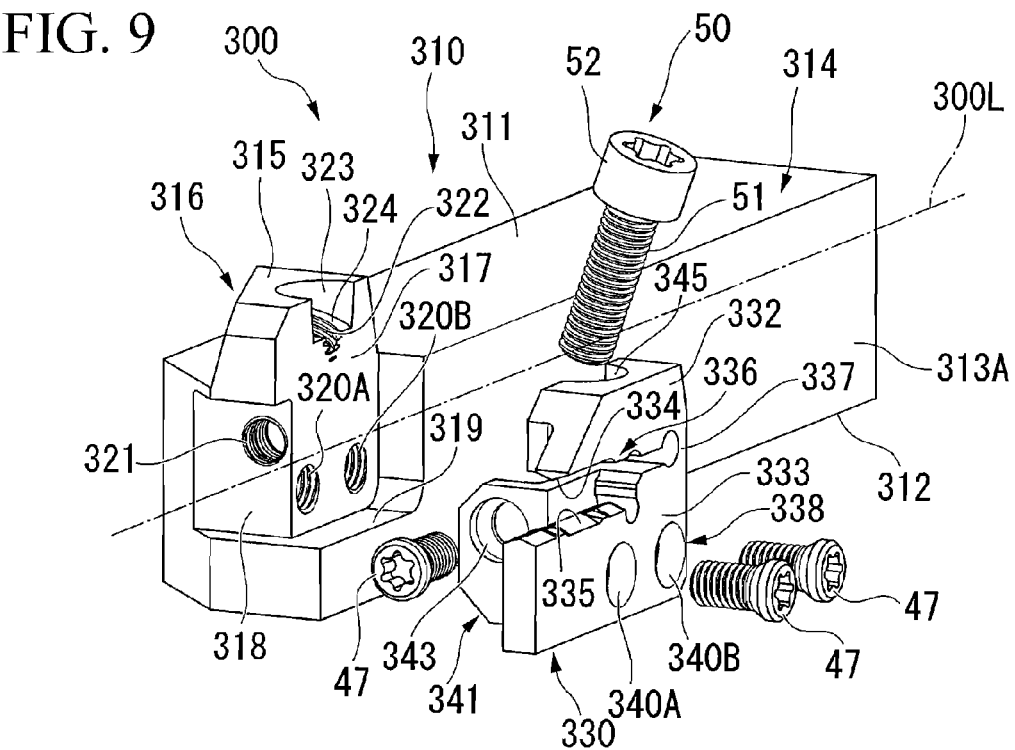
FIG. 9 is an exploded perspective view of an insert-indexable tool according to a third embodiment of the present invention.
Figure 10:
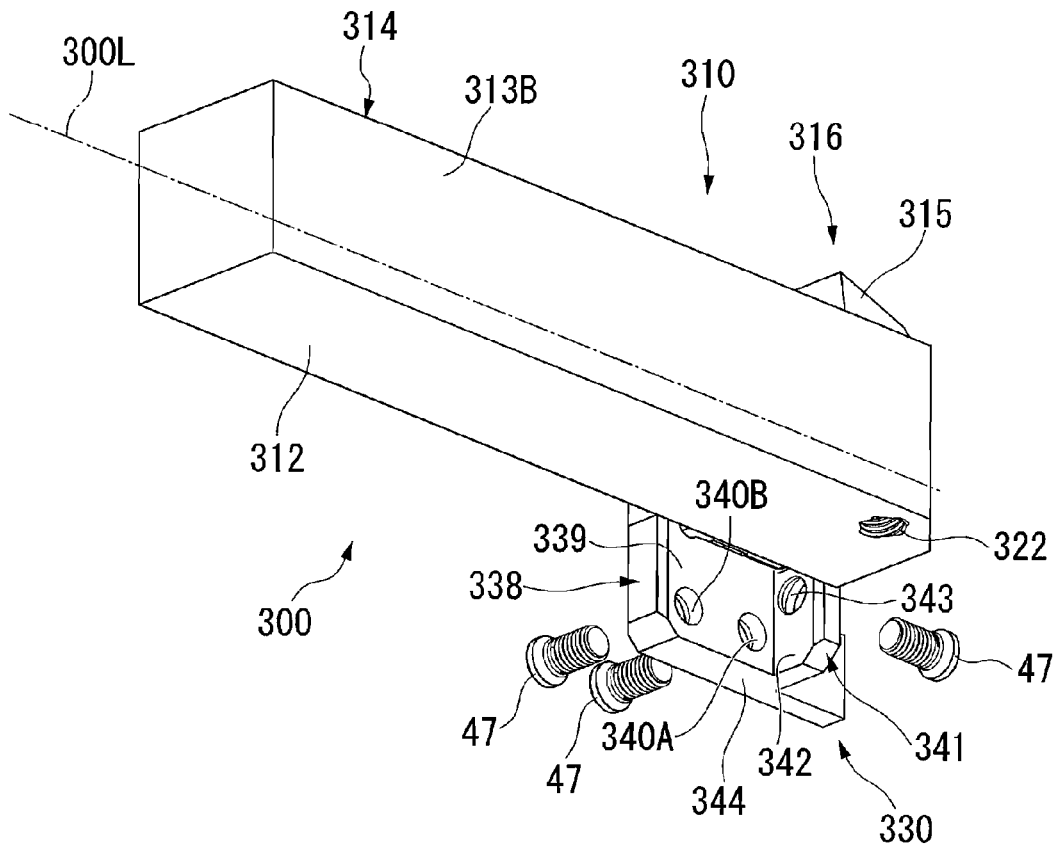
FIG. 10 is another exploded perspective view of the insert-indexable tool according to the third embodiment of the present invention, as viewed from a view point which is different from that in FIG. 9.

Next, a third embodiment of the present invention will be explained below. FIGS. 9 and 10 show a holder 310 and a head member 330 of an insert-indexable tool 300 according to the third embodiment (illustration of the insert 60 is omitted). It should be noted that the same reference symbols are applied to the elements included in the first embodiment, and explanation thereof will be omitted.

In the insert-indexable tool 300, a third receiving face 319 is extended farther toward the distal end of the holder 310 than a second receiving face 318, and thus the third receiving face 319 is configured in a substantially L-shape as viewed from the direction perpendicular to an axis 300L and in parallel with a first receiving face 317.

The second receiving face 318 having a reduced size due to such a configuration of the third receiving face 319 is provided with only one second fixing threaded hole 321. Moreover, the first receiving face 317 is provided with two first fixing threaded holes 320A and 320B extending in the direction perpendicular to the first receiving face 317, and aligned in the direction of the axis 300L.

The first fixing threaded holes 320A and 320B, and the second fixing threaded hole 321 are, as conceived in the direction perpendicular to the axis L and in parallel with the first receiving face 317, arranged at positions different from each other. As shown in FIG. 9, in this embodiment, the first fixing threaded holes 320A and 320B are located below the second fixing threaded hole 321.

In the head member 330 that is to be mounted on a mount portion 316 configured as described above, the surfaces of a first plate 338 and a second plate 341 oriented downward are formed within a plane configured in an L-shape and designated as a third mount face 344 that is to be abutted with the third receiving face 319. Accordingly, as shown in FIGS. 9 and 10, the head member 330 is configured in a comparatively simple shape. In addition, a second mount face 342 is provided with a second insertion hole 343.

According to the insert-indexable tool 300 configured as described above, advantageous effects can be obtained, which are similar to that obtained by the first embodiment, and moreover, the head member 330 can be manufactured at a low cost. In addition, because the third receiving face 319 is configured in a large size, the primary component of the cutting force can be reliably received by the third receiving face 319, and shifting of the head member 330 can be prevented in more reliable manner.

Figure 11:
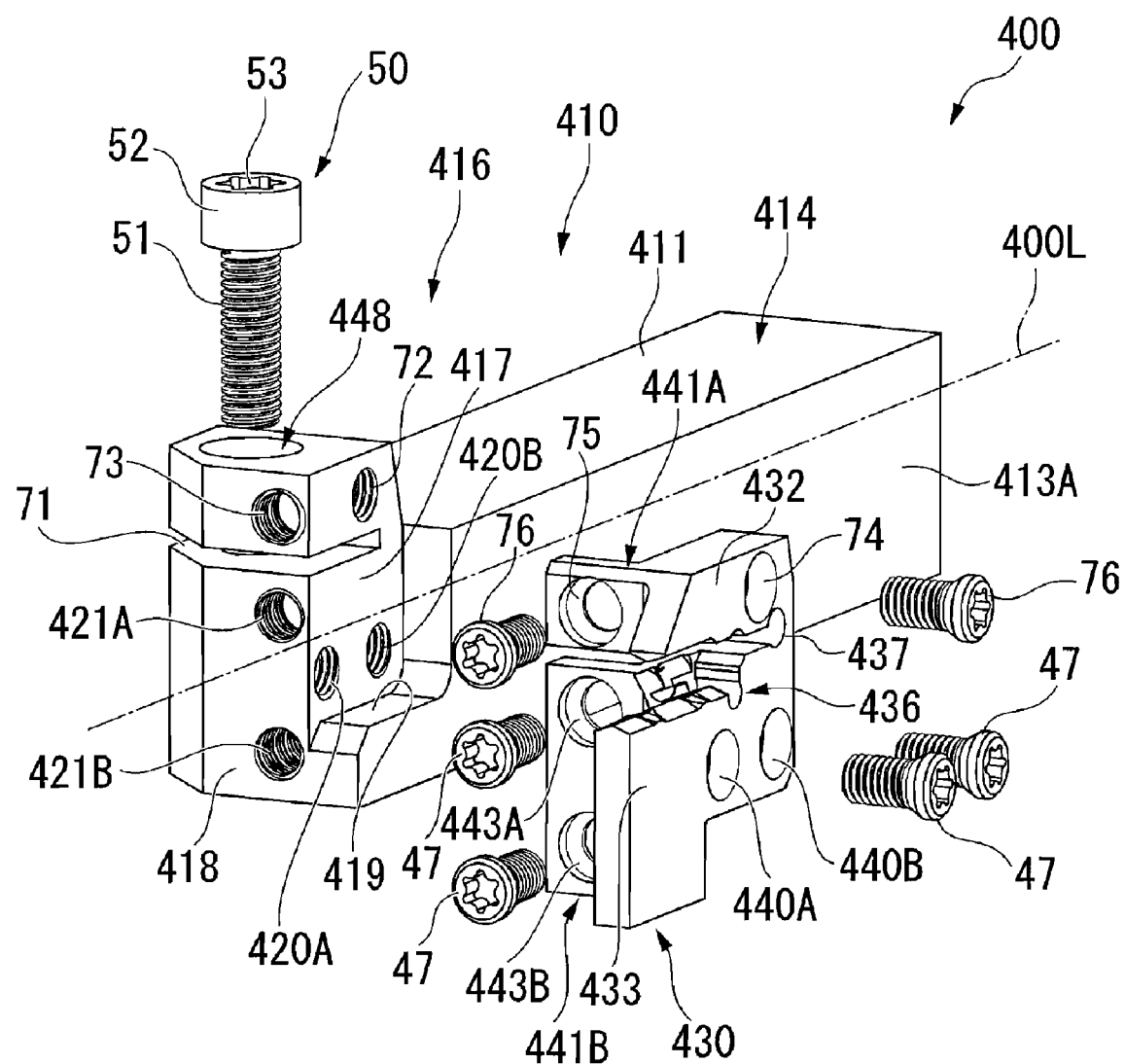
FIG. 11 is an exploded perspective view of an insert-indexable tool according to a fourth embodiment of the present invention.
Figure 12:
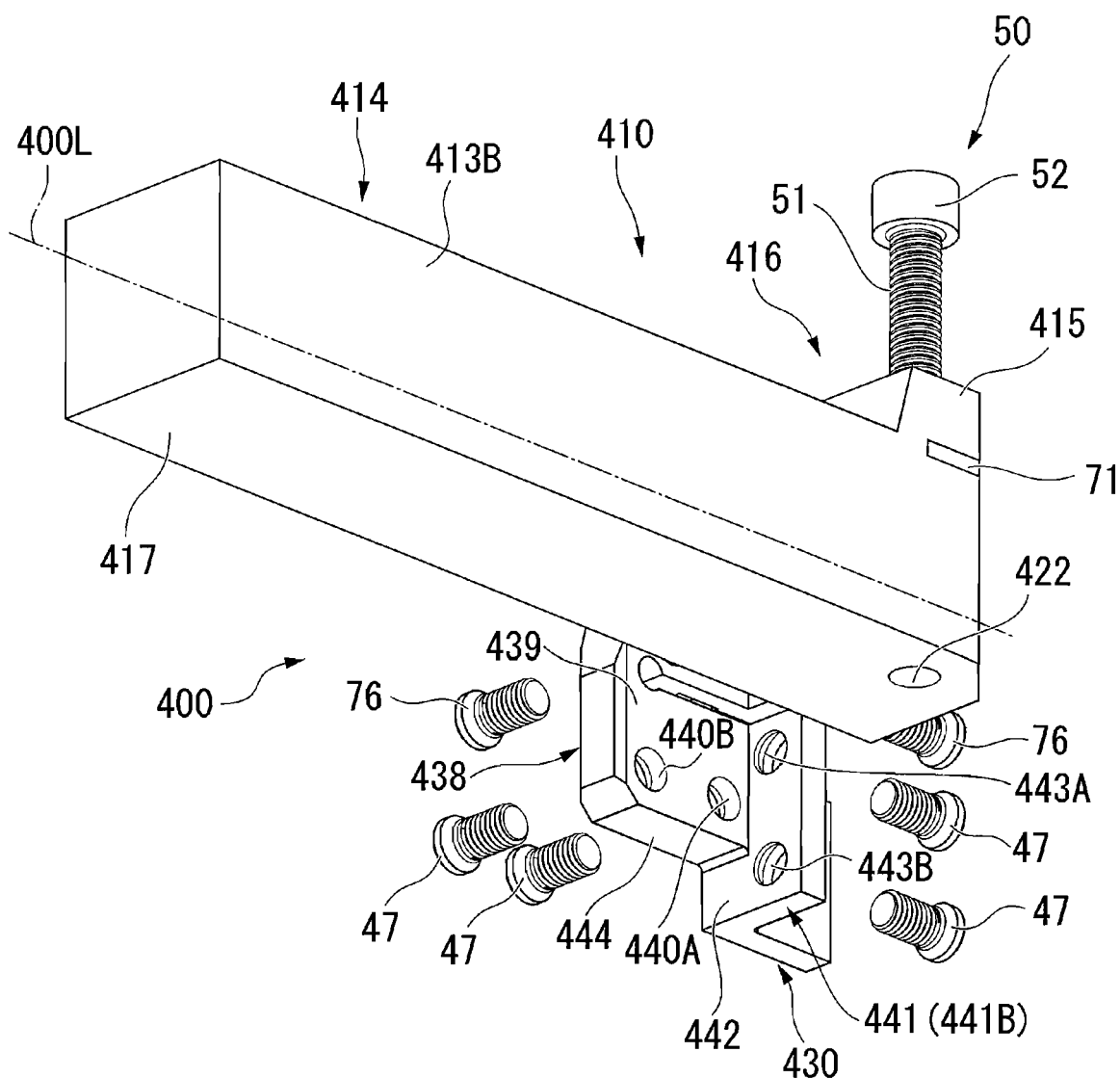
FIG. 12 is another exploded perspective view of the insert-indexable tool according to the fourth embodiment of the present invention, as viewed from a view point which is different from that in FIG. 11.

Next, a fourth embodiment of the present invention will be explained below. FIGS. 11 and 12 show a holder 410 and a head member 430 of an insert-indexable tool 400 according to the fourth embodiment (illustration of the insert 60 is omitted). It should be noted that the same reference symbols are applied to the elements included in the first embodiment, and explanation thereof will be omitted.

In the insert-indexable tool 400, a projected portion 415 formed at the distal portion of the holder 410 is also provided with a second receiving face 418.

The projected portion 415 includes a slit 71 extending along an extension surface of an upper face 411 and opening at the distal end of the holder 410. A clamping threaded hole 422 is formed so as to be perpendicular to the slit 71. An accommodating portion 448, in which the head portion 52 of the clamping screw 50 is to be accommodated, is formed at an upper opening portion of the clamping threaded hole 422.

The slit 71 is configured so as to also open in a first receiving face 417, and a portion of the first receiving face 417 above the slit 71 and a portion of the first receiving face 417 below the slit 71 are arranged within a plane. The portion of the first receiving face 417 below the slit 71 is provided with two first fixing threaded holes 420A and 420B extending in the direction perpendicular to the first receiving face 417, and aligned in the direction of an axis 400L. The portion of the first receiving face 417 above the slit 71 is provided a first upper threaded hole 72 extending in parallel with the first fixing threaded holes 420A and 420B.

Moreover, a portion of the second receiving face 418 above the slit 71 and a portion of the second receiving face 418 below the slit 71 are arranged within a plane. The portion of the second receiving face 418 below the slit 71 is provided with two second fixing threaded holes 421A and 421B extending in the direction perpendicular to the second receiving face 418, and aligned in the direction perpendicular to the axis 400L and in parallel with the first receiving face 417. The portion of the second receiving face 418 above the slit 71 is provided a second upper threaded hole 73 extending in parallel with the second fixing threaded holes 421A and 421B.

Figure 1:
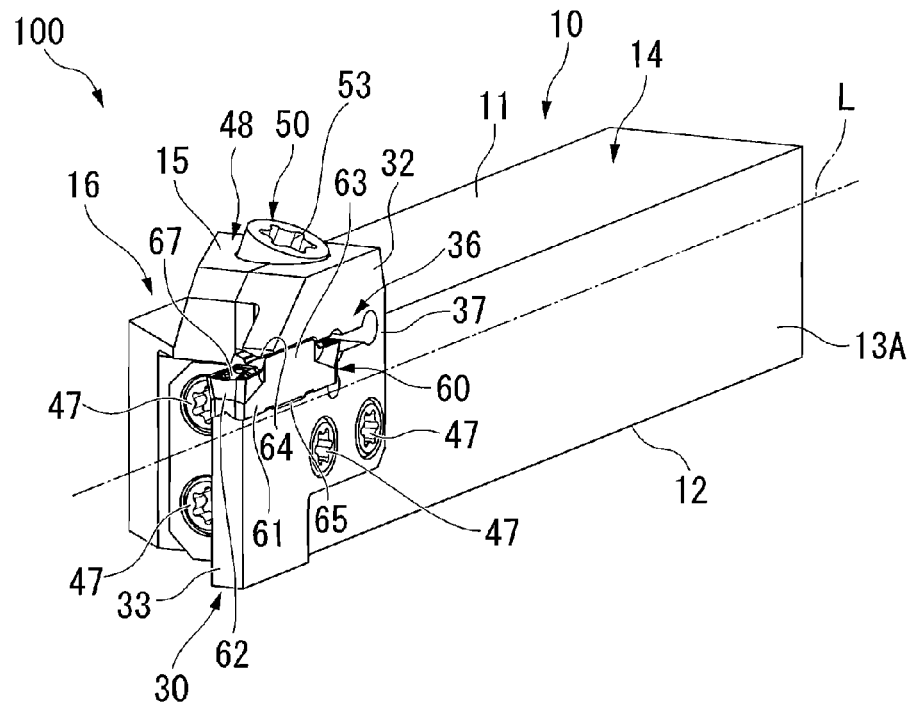
FIG. 1 is a perspective view showing an insert-indexable tool according to a first embodiment of the present invention.

The first fixing threaded holes 420A and 420B, and the second fixing threaded holes 421A and 421B are, as conceived in the direction perpendicular to the axis 400L and in parallel with the first receiving face 417, arranged at positions different from each other. As shown in FIG. 1, in this embodiment, the first fixing threaded holes 420A and 420B are located between the second fixing threaded holes 421A and 421B that are aligned in the direction perpendicular to the axis 400L and in parallel with the first receiving face 417.

In the head member 430, a second plate 441 is also projected from an upper jaw 432 so as to be perpendicular to a first mount face 439. More specifically, in this embodiment, the second plate 441 includes an upper plate 441A provided in the upper jaw 432, and a lower plate 441B provided in a lower jaw 433. The upper jaw 432 is provided with a first upper insertion hole 74 extending in the direction perpendicular to the first mount face 439, and the second plate 441 (the upper plate 441A) extending from the upper jaw 432 is provided with a second upper insertion hole 75 extending in the direction perpendicular to a second mount face 442. By screwing upper fixing screws 76 into the first and second upper insertion holes 74 and 75, the portion of the projected portion 415 above the slit 71 and the upper jaw 432 are connected.

Accordingly, by screwing the clamping screw 50 into the clamping threaded hole 22 formed in the projected portion 415, the portion of the projected portion 415 above the slit 71 is pressed by the head portion 52 of the clamping screw 50, and the upper jaw 432 connected to the portion of the projected portion 415 above the slit 71 by the upper fixing screw 76 is also elastically deformed, thereby a pressing face 434 is urged to be close to a base face 435.

According to the insert-indexable tool 400 configured as described above, advantageous effects can be obtained, which are similar to that obtained by the first embodiment, and moreover, the clamping threaded hole 422 can be easily formed, and thus the insert-indexable tool 400 can be manufactured at a low cost.

Figure 13:
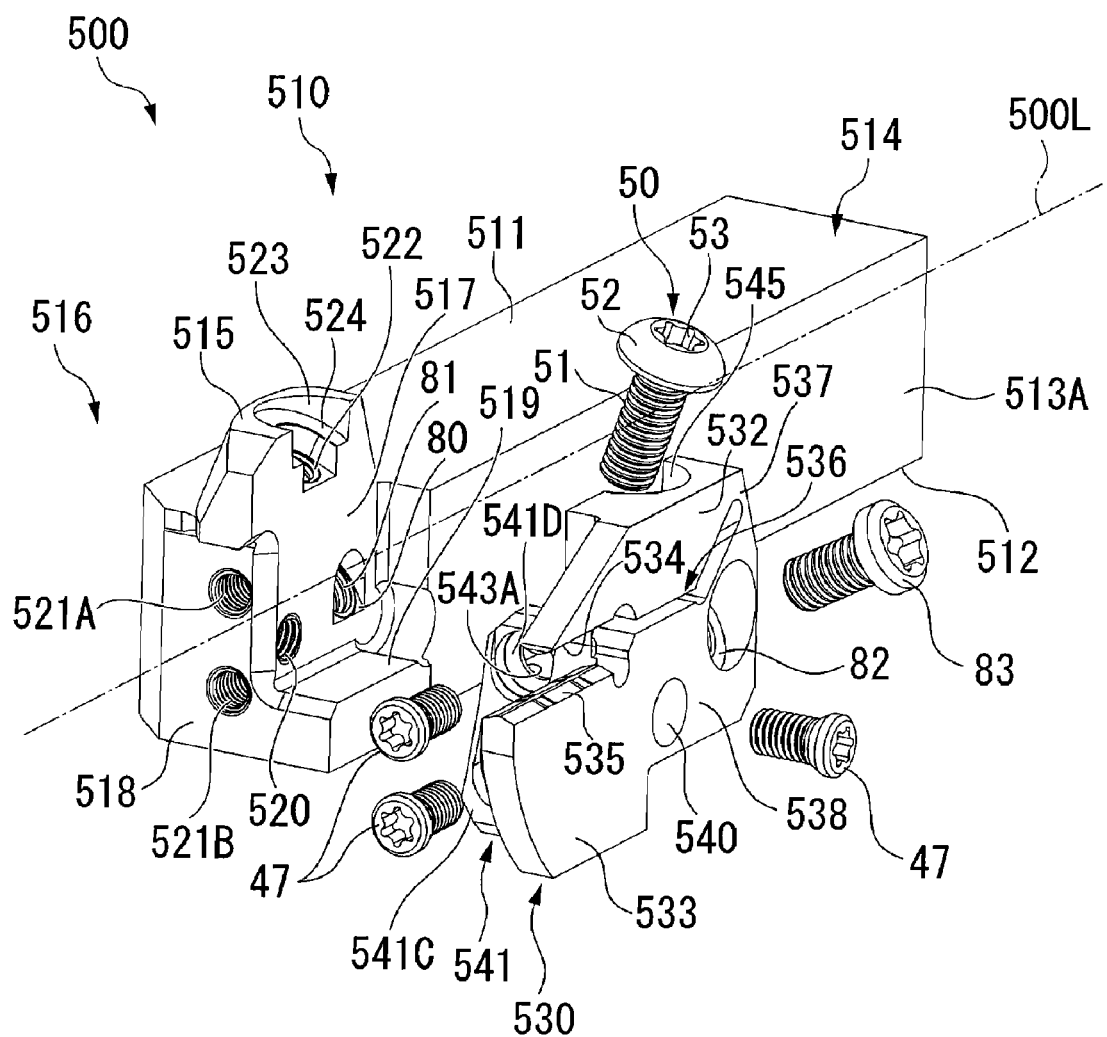
FIG. 13 is an exploded perspective view of an insert-indexable tool according to a fifth embodiment of the present invention.
Figure 14:
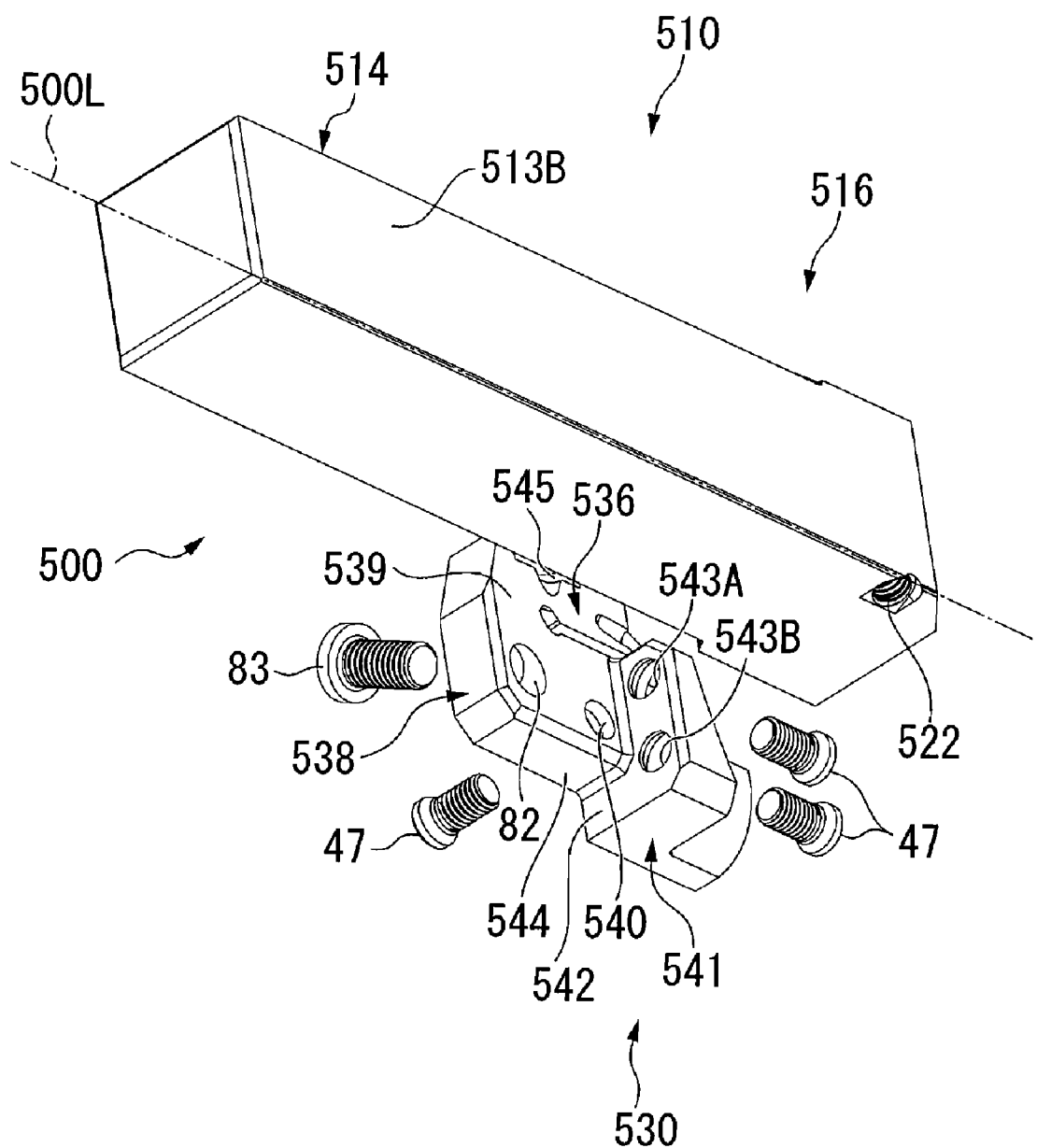
FIG. 14 is another exploded perspective view of the insert-indexable tool according to the fifth embodiment of the present invention, as viewed from a view point which is different from that in FIG. 13.

Next, a fifth embodiment of the present invention will be explained below. FIGS. 13 and 14 show a holder 510 and a head member 530 of an insert-indexable tool 500 according to the fifth embodiment (illustration of the insert 60 is omitted). It should be noted that the same reference symbols are applied to the elements included in the first embodiment, and explanation thereof will be omitted.

In the insert-indexable tool 500, a first receiving face 517 is provided with only one first fixing threaded hole 520, and a drawing threaded hole 81 is located at a position farther from a second receiving face 518 than the first fixing threaded hole 520.

The drawing threaded hole 81 obliquely intersects the first receiving face 517 while gradually approaching a third receiving face 519 as extending toward the inside of the holder 510. More specifically, the first receiving face 517 is provided with a recess face 80, which extends away from a first side face 513A of the holder 510 as extending away from a third receiving face 519, at a position farther from a second receiving face 518 than a first fixing threaded hole 520, and the drawing threaded hole 81 is formed so as to perpendicularly intersect the recess face 80.

Moreover, a first plate 538 of the head member 530 is provided with a through hole 82 extending in the direction gradually approaching a third mount face 544 as extending toward a first mount face 539 so as to obliquely intersect the first mount face 539.

It should be noted that, in this embodiment, a second plate 541 is configured in such a manner that an outer face 541C thereof that is located on the side opposite to a second mount face 542 is not in parallel with the second mount face 542. The outer face 541C is provided with second insertion holes 543A and 543B, and spot facings 541D are respectively formed at opening portions of the second insertion holes 543A and 543B.

The head member 530 is to be mounted on a mount portion 516 of the holder 510 by the fixing screws 47. During a mounting operation, a drawing screw 83 is inserted into the through hole 82 of the first plate 538, and is screwed into drawing threaded hole 81 formed in the first receiving face 519.

According to the insert-indexable tool 500 configured as described above, because the first receiving face 517 is provided with the drawing threaded hole 81 that obliquely intersects the first receiving face 517 while gradually approaching the third receiving face 519 as extending toward the inside of the holder 510, and the drawing screw 83 is inserted into the head member 530 and is screwed into the drawing threaded hole 81, the head member 530 can be fixed while being urged to and firmly contact the third receiving face 519 provided in the mount portion 516 of the holder 510, and thus the holder 510 and the head member 530 can be firmly fixed to each other.

Figure 15:
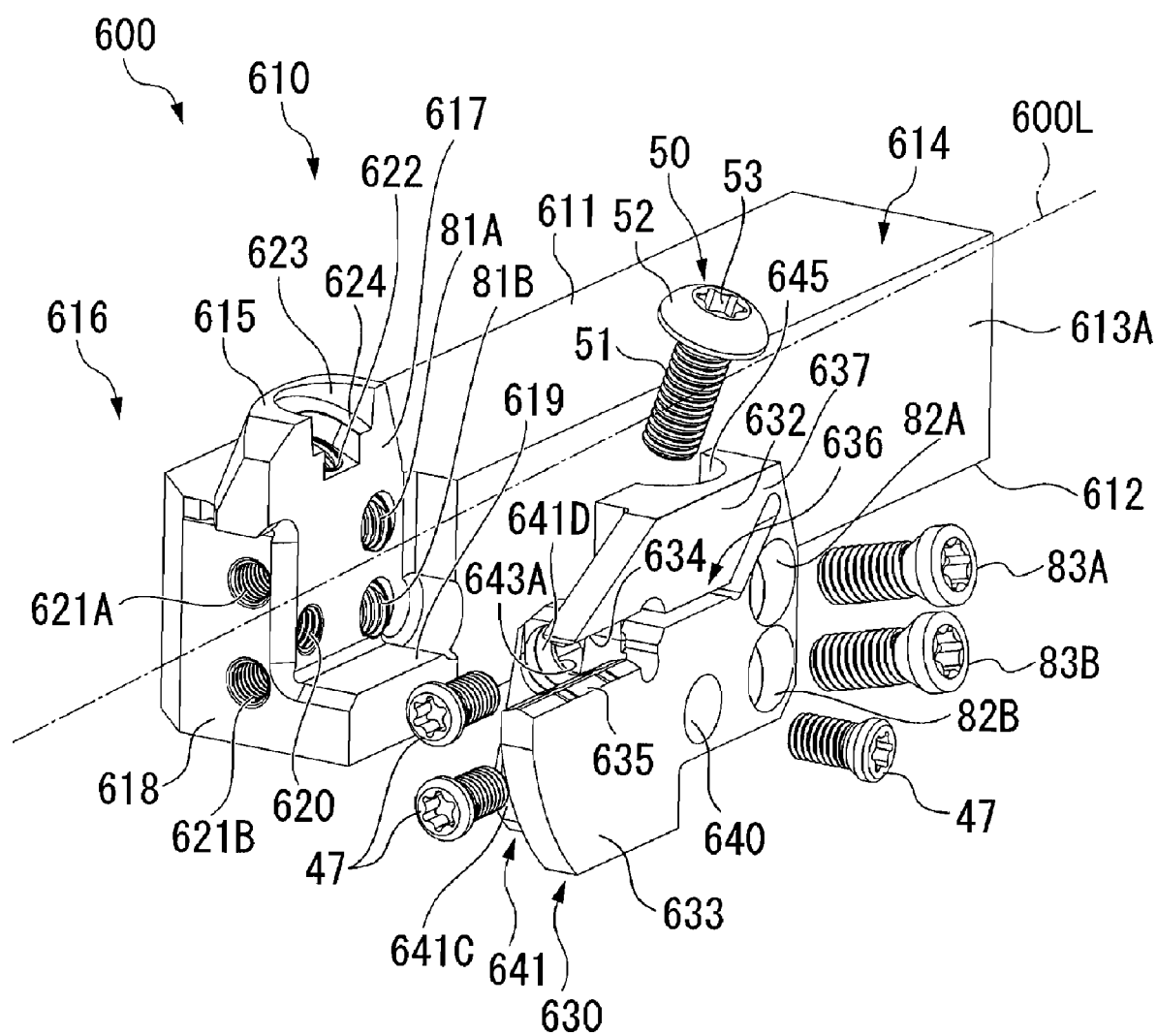
FIG. 15 is an exploded perspective view of an insert-indexable tool according to a sixth embodiment of the present invention.
Figure 16:
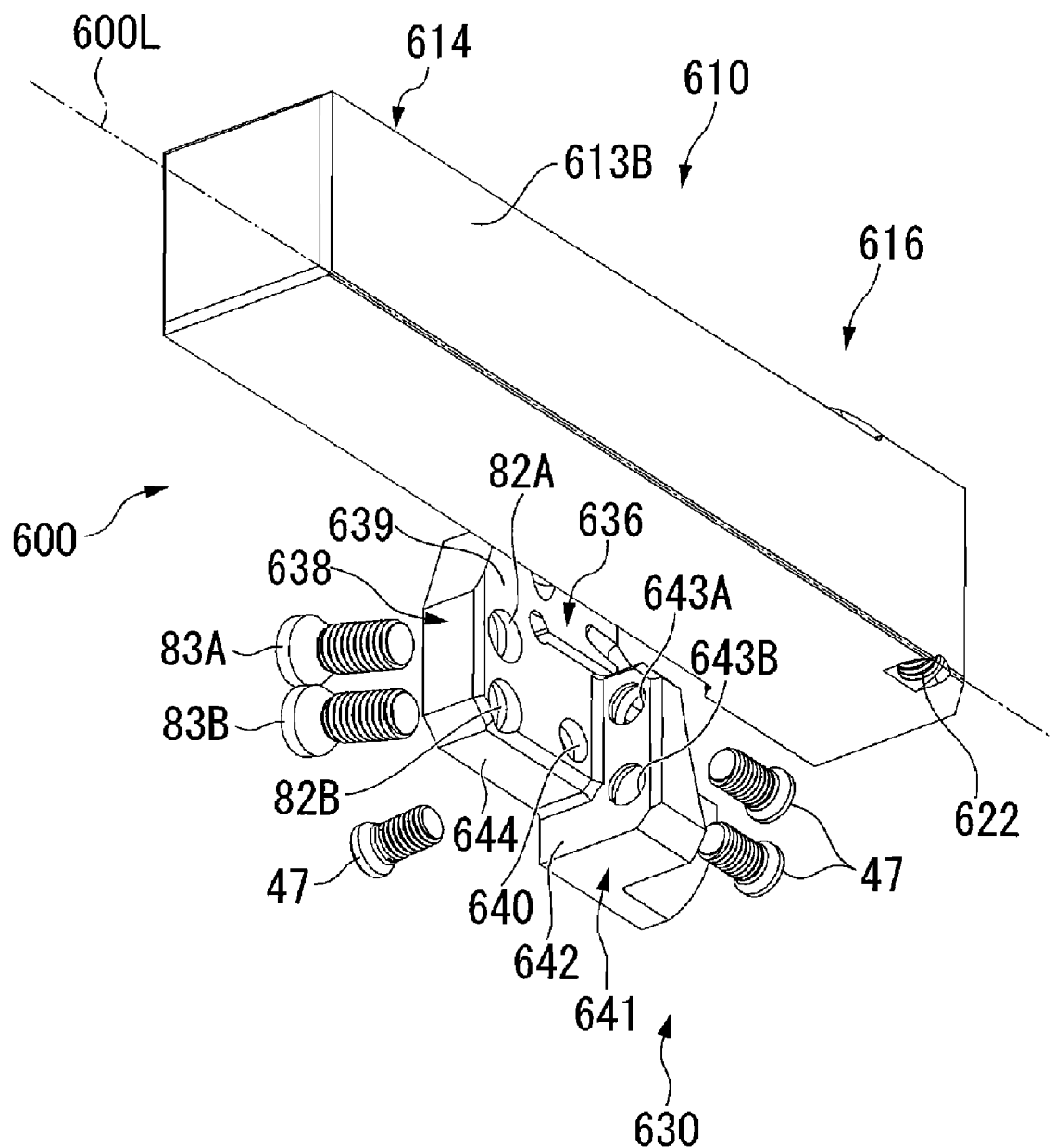
FIG. 16 is another exploded perspective view of the insert-indexable tool according to the sixth embodiment of the present invention, as viewed from a view point which is different from that in FIG. 15.

Next, a sixth embodiment of the present invention will be explained below. FIGS. 15 and 16 show a holder 610 and a head member 630 of an insert-indexable tool 600 according to the sixth embodiment (illustration of the insert 60 is omitted). It should be noted that the same reference symbols are applied to the elements included in the fifth embodiment, and explanation thereof will be omitted.

In the insert-indexable tool 600, a first receiving face 617 is provided with only one first fixing threaded hole 620, and two drawing threaded holes 81A and 81B located at positions farther from a second receiving face 618 than the first fixing threaded hole 620.

The drawing threaded holes 81A and 81B obliquely intersect the first receiving face 617 while gradually approaching a third receiving face 619 as extending toward the inside of the holder 610. Moreover, the drawing threaded holes 81A and 81B are arranged in the vertical direction of the holder 610.

A first plate 638 of the head member 630 is provided with two through holes 82A and 82B extending in the direction gradually approaching a third mount face 644 as extending toward a first mount face 639 so as to obliquely intersect the first mount face 639.

It should be noted that, in this embodiment, a second plate 641 is configured in such a manner that an outer face 641C thereof that is located on the side opposite to a second mount face 642 is not in parallel with the second mount face 642. The outer face 641C is provided with second insertion holes 643A and 643B, and spot facings 641D are respectively formed at opening portions of the second insertion holes 643A and 643B.

The head member 630 is to be mounted on a mount portion 616 of the holder 610 by the fixing screws 47. During a mounting operation, drawing screws 83A and 83B are inserted into the holes 82A and 82B of the first plate 538, and are screwed into drawing threaded holes 81A and 81B formed in the first receiving face 617.

According to the insert-indexable tool 600 configured as described above, because the first receiving face 617 is provided with two drawing threaded holes 81A and 81B that obliquely intersect the first receiving face 617 while gradually approaching the third receiving face 619 as extending toward the inside of the holder 610, and the screws 83A and 83B are inserted into the head member 630 and are screwed into the drawing threaded holes 81A and 81B, the head member 630 can be fixed while being urged to and firmly contact the third receiving face 619 provided in the mount portion 616 of the holder 610, and thus the holder 610 and the head member 630 can be firmly fixed to each other.

While the insert-indexable tools according to the embodiments of the present invention have been described above, it should be understood that the present invention is not to be considered as limiting, and various modifications can be made without departing from the technical spirit of the invention.

For example, the description has been made assuming that the first receiving face and the second receiving face are perpendicularly intersect each other; however, the configuration is not limited to this, and these faces may be obliquely intersect each other.

Moreover, the description has been made assuming that the first fixing threaded holes and the first insertion holes are arranged in an offset manner such that the first fixing threaded holes are located farther from the second receiving face than the first insertion holes, and closer to the third receiving face than the first insertion holes; however, the configuration is not limited to this, and these may be arranged in a non-offset manner. It should be noted that it is preferable that the first fixing threaded holes be arranged so as to be either shifted away from the second receiving face, or shifted toward the third receiving face respect to the first insertion holes because the head member can be firmly fixed.

Similarly, the description has been made assuming that the second fixing threaded holes and the second insertion holes are arranged in an offset manner such that the second fixing threaded holes are located farther from the first receiving face than the second insertion holes, and closer to the third receiving face than the second insertion holes; however, the configuration is not limited to this, and these may be arranged in a non-offset manner. It should be noted that it is preferable that the second fixing threaded holes be arranged so as to be either shifted away from the first receiving face, or shifted toward the third receiving face with respect to the second insertion holes because the head member can be firmly fixed.

Moreover, the description has been made assuming that the third receiving face is provided that perpendicularly intersects both the first receiving face and the second receiving face; however, the third receiving face may not be provided. In this case, it is preferable that the angles $\alpha 1$ and $\alpha 2$ at which the first fixing threaded holes and the first insertion holes are offset, and the angles $\beta 1$ and $\beta 2$ at which the second fixing threaded holes and the second insertion holes are offset be set less than 90°.

Furthermore, the description has been made assuming that the insert mount seat is constituted by the pressing face and the base face, and the rod-shaped insert is held; however, the configuration is not limited to this, and an insert configured in a polygonal plate shape may be fixed using a screw.

Moreover, the description has been made assuming that both of the base face and the pressing face are configured in a projected V-shape; however, the configuration is not limited to this, and the base face and the pressing face may be configured in a plane shape, or in a concave V-shape.

The shape of the insert is not limited to that described in the embodiments, and other shapes of the insert may be employed.

Furthermore, the description has been made for the fifth and sixth embodiments assuming that the first receiving face is provided with the drawing threaded hole(s); however, the configuration is not limited to this, and the drawing threaded hole(s) may be provided in the second receiving face.

Moreover, the drawing threaded hole provided in the first receiving face may obliquely intersect the first receiving face while gradually approaching the third receiving face and separating from the second receiving face as extending toward the inside of the holder. In this case, the head member can be fixed to the holder while the head member is urged to and contact the third receiving face and the second receiving face by the drawing screw.

What is claimed is:

1. An insert-indexable tool comprising:

a holder; and a head member having an insert mount seat by which an insert having a cutting edge and a cutting face is to be held, and mounted on a distal portion of the holder, wherein the head member includes a first mount face and a second mount face intersect each other from a view facing toward the cutting face in a state in which the insert is held by the insert mount seat, the holder includes, at the distal portion thereof, a first receiving face abutting the first mount face and a second receiving face abutting the second mount face, the first receiving face and the second receiving face are respectively provided with a first fixing threaded hole and a second fixing threaded hole into which fixing screws inserted into the first mount face and the second mount face are screwed, and the first fixing threaded hole and the second fixing threaded hole are located so that the fixing screws screwed into the first and second fixing threaded holes do not intersect each other.

2. The insert-indexable tool according to claim 1, wherein the head member includes a first jaw having a pressing face, and a second jaw having a base face which faces the pressing face, the pressing face and the base face constituting the insert mount seat, the insert is held by the insert mount seat while a surface on a side opposite to the cutting face is seated on the base face, and the fixing screw is inserted into one of the first and second mount faces corresponding to the second jaw.

3. The insert-indexable tool according to claim 1, wherein the first mount face is provided with a first insertion hole, and in a state in which the first mount face abuts the first receiving face and the second mount face abuts the second receiving face, the first fixing threaded hole and the first insertion hole are arranged in an offset manner such that the first fixing threaded hole is located farther from the second receiving face than the first insertion hole.

4. The insert-indexable tool according to claim 1, wherein the second mount face is provided with a second insertion hole, and in a state in which the first mount face abuts the first receiving face and the second mount face abuts the second receiving face, the second fixing threaded hole and the second insertion hole are arranged in an offset manner such that the second fixing threaded hole is located farther from the first receiving face than the second insertion hole.

5. The insert-indexable tool according to claim 1, wherein the holder includes a third receiving face oriented in a direction same as the cutting face, and the head member includes a third mount face which is to be abutted with the third receiving face.

6. The insert-indexable tool according to claim 5, wherein, in a state in which the first mount face abuts the first receiving face and the second mount face abuts the second receiving face, at least one of the first fixing threaded hole and the second fixing threaded hole is arranged closer to the third receiving face than at least one of the first insertion hole and the second insertion hole into which the fixing screw or screws to be screwed into the at least one of the first fixing threaded hole and the second fixing threaded hole are inserted.

7. The insert-indexable tool according to claim 5, wherein at least one of the first receiving face and the second receiving face is provided with a drawing threaded hole at a position farther from the other of the first receiving face and the second receiving face than the fixing threaded hole formed therein, and the drawing threaded hole obliquely intersects at least one of the first receiving face and the second receiving face while gradually approaching the third receiving face as extending toward an inside of the holder.

8. The insert-indexable tool according to claim 5, wherein the third receiving face or an extension thereof extended in a direction along which the insert extends intersects the second receiving face.

9. The insert-indexable tool according to claim 5, the insert is disposed so as to at least partially overlap the third receiving face from a view facing toward the cutting face.

10. The insert-indexable tool according to claim 2, wherein a distal portion of the holder is provided with a clamping screw that elastically deforms the head member so that the first jaw and the second jaw approach each other, and the clamping screw obliquely extends, with respect to a direction facing toward the cutting face, away from the first receiving face as extending from the first jaw toward the second jaw.

11. The insert-indexable tool according to claim 1, wherein the first fixing threaded hole and the second fixing threaded hole are located at positions different from each other on a coordinate axis in parallel with a normal of the cutting face.

* * * * *